(12) United States Patent
Exley et al.

(10) Patent No.: US 6,290,432 B1
(45) Date of Patent: Sep. 18, 2001

(54) DIVERLESS SUBSEA HOT TAP SYSTEM

(75) Inventors: Gern D. Exley; Donald W. Cross, both of Houston; Oran Tarlton, League City; Larry Decker, The Woodlands, all of TX (US); David J. Hicks, Tulsa, OK (US); Richard W. McCoy, Houston, TX (US)

(73) Assignee: Williams Field Services Gulf Coast Company, L.P., Tulsa, OK (US)

( * ) Notice: Subject to any disclaimer, the term of this patent is extended or adjusted under 35 U.S.C. 154(b) by 0 days.

(21) Appl. No.: 09/417,553

(22) Filed: Oct. 13, 1999

Related U.S. Application Data

(60) Provisional application No. 60/128,014, filed on Apr. 6, 1999.

(51) Int. Cl.[7] .................................. B08B 9/04; F16L 1/12
(52) U.S. Cl. .................. 405/173; 15/104.062; 73/64.56; 137/317; 405/170; 405/158
(58) Field of Search .................................. 405/158, 169, 405/170, 173; 137/315, 317; 73/37, 52, 64.56; 15/104.061, 104.062

(56) References Cited

U.S. PATENT DOCUMENTS

| | | |
|---|---|---|
| Re. 27,745 | 8/1973 | Brooks et al. . |
| 3,508,410 | 4/1970 | Lynch . |
| 3,578,233 | 5/1971 | Meister et al. . |
| 3,827,448 | 8/1974 | Alba ........................................ 137/15 |
| 3,851,492 | 12/1974 | Cannon et al. . |
| 4,076,130 | 2/1978 | Sumner . |
| 4,091,514 | 5/1978 | Motes-Conners et al. . |
| 4,116,015 | 9/1978 | Duncan ................................ 405/169 |
| 4,155,669 | 5/1979 | Rochelle ................................ 405/158 |
| 4,223,925 | 9/1980 | Reneau et al. ........................ 285/197 |
| 4,229,121 | * 10/1980 | Brown ................................ 405/158 |
| 4,436,449 | 3/1984 | Smoot et al. ........................ 405/170 |
| 4,441,328 | 4/1984 | Brister . |
| 4,443,129 | 4/1984 | de Sivry et al. ...................... 405/170 |
| 4,450,857 | 5/1984 | Baugh et al. ........................ 137/318 |
| 4,535,822 | 8/1985 | Rogers, Jr. ............................ 138/99 |
| 4,579,480 | 4/1986 | Szabo et al. ........................ 405/169 |
| 4,579,484 | 4/1986 | Sullivan ................................ 408/56 |
| 4,720,213 | 1/1988 | Gernhardt et al. .................... 405/190 |
| 4,784,525 | 11/1988 | Francois .............................. 405/191 |
| 4,832,530 | 5/1989 | Andersen et al. .................... 405/170 |
| 4,878,694 | 11/1989 | Castel ................................ 285/24 |
| 4,880,335 | 11/1989 | Lee .................................... 405/158 |
| 5,074,713 | 12/1991 | Reis .................................... 405/169 |
| 5,439,331 | 8/1995 | Andrew et al. ........................ 408/8 |
| 5,593,249 | 1/1997 | Cox et al. ............................ 405/191 |
| 5,642,965 | 7/1997 | Dos Reis et al. .................... 405/191 |
| 6,200,068 | * 3/2001 | Bath et al. .......................... 405/154 |

* cited by examiner

*Primary Examiner*—David Bagnell
*Assistant Examiner*—Tara L. Mayo
(74) *Attorney, Agent, or Firm*—Head, Johnson & Kachigian

(57) ABSTRACT

A diverless process of tapping a pressurized subsea pipeline without removing the pipeline from service. The process includes the steps of lowering and landing a measurement tool onto the pipeline in order to check ovality and straightness of the pipeline with the measurement tool. Pipe lift frames are lowered and landed onto the pipeline spaced from a chosen location. The pipeline is lifted by hydraulic actuators or mechanical screws on the lift frames. A hot tap fitting and accompanying orientation frame are lowered and landed on the pipeline between the pipe lift frames. The pipe lift frames are incrementally raised until the pipeline is fully seated in the hot tap fitting and orientation frame. A fitting clamp is secured to the pipeline. A hot tap machine is lowered onto the hot tap fitting and orientation frame. The pipeline is then tapped with the hot tap machine. The pipeline is thereafter lowered by deflating the lift frame bags.

15 Claims, 16 Drawing Sheets

DIVERLESS SUBSEA HOT TAP SYSTEM

CROSS-REFERENCE OF RELATED APPLICATION

This application claims priority to U.S. Provisional Patent Application No. 60/128,014 filed Apr. 6, 1999, entitled DIVERLESS SUBSEA HOT TAP SYSTEM.

BACKGROUND OF THE INVENTION

1. Field of the Invention.

The present invention relates to a diverless process for tapping a pressurized subsea pipeline without removing the pipeline from service. This diverless process utilizes specialty clamping equipment, tapping equipment and remote operating vehicles for operating at water depths beyond that accessible by divers.

2. Prior Art

Various kinds of underwater pipeline work have been carried out using divers equipped with various tools. Deep water conditions entail high subsea pressure and dangerous conditions. Manned or diver equipped operations are not suitable if the pipeline is at a depth which is inaccessible by divers.

Remote operating vehicles perform visual and operational functions that are more limited than those functions performed by divers. To compensate for this limitation, processes must be developed to adapt the available technology to the work requirements. These processes are typically referred to as "diverless". Developed diverless processes are easily adapted for use using divers and/or control from the sea surface in diver accessible water depths.

It has been proposed in the past to utilize a diverless underwater pipe tap system. De Sivry et al. (U.S. Pat. No. 4,443,129) discloses an example of a diverless underwater pipe tap system including a lifting device to engage and displace the pipe, a working platform installed vertically above the tapping region and various tools used to carry out operations including concrete stripping, ovality or roundness measurement, and a tapping operation. De Sivry et al. contemplates cutting out a section of the pipeline. There is no disclosure or suggestion of a tap procedure while the pipeline is under pressure and de Sivry would not be suitable for such an operation.

Likewise, various hot tap machines for tapping into a pipeline while the pipeline is pressurized have been disclosed. Reneau et al. (U.S. Pat. No. 4,223,925) discloses one example of a hot tap machine for an underwater pipeline. It is advantageous to perform work on the pipeline without interrupting the flow of liquids or gases therethrough.

It is also known to provide a remote operated subsea vehicle (ROV) controlled from the surface which includes thrusters or other mechanisms for propelling it through the water in response to a source of power at or controlled from the surface.

Brooks et al. (Re27,745) illustrates an example of a submersible wireline robot unit that may be controlled remotely.

None of the foregoing would be suitable for deep water conditions where the external subsea pressure is extreme.

Given that the life spans of certain deep water oil and gas developments will be coming to an end in the near future, there will be an increasing number of existing pipelines which have excess transport capacity, thereby leaving excess pipeline infrastructure in deep water locations.

If production from new fields can be tied into existing pipelines, then the investment in the pipeline can be spread out over more than one development. A diverless hot tap capability would allow the extension of pipelines from new fields to be connected to existing pipelines. This will reduce the overall length of the pipeline required to support a new field.

It would also be possible to lay new trunk lines into areas in order to support multiple future field developments which would use lateral pipelines without having to pre-install connection facilities and valves at predetermined locations along the pipeline.

Additionally, in deep water oil and gas developments, the cost of the pipeline infrastructure is estimated to be the majority of the cost of all of the installed subsea equipment.

As an alternative to diverless hot tap systems, it would be possible to take an existing line out of service, cut a section of the pipeline and bring it to the surface, install a valve, lower the section back to the bottom and reconnect with a suitable jumper. Such an approach is not only time-consuming but requires the pipeline to be out of service. It would also be possible to pre-install blind branch connection facilities in the pipeline for future tie-ins. A disadvantage is that a great number of branch facilities would have to be installed to cover all possible future tie-in locations, a procedure that would be both time-consuming and expensive.

Notwithstanding the foregoing, there remains a need for a diverless process of tapping a deep water subsea pipeline under high pressure without removing the pipeline from service.

SUMMARY OF THE INVENTION

The present invention is directed to a diverless process for tapping a deep water, pressurized subsea pipeline without removing the pipeline from service.

During the initial stages of the process, a pipeline will be located and a preliminary visual condition inspection will be conducted through use of cameras. Cameras would be incorporated in a remote operating vehicle which is known in various configurations. The pipeline will be inspected in the area of interest and a pipe section will be identified. If the pipe contains a longitudinal weld or seam, the location of the seam will be identified. It is preferred, but not required, to select a location where a weld seam is not cut out with the hole being bored into the pipe during the tapping operation. For seamless pipe, this step is ignored. Additionally, a location will be identified away from any circumferential weld so that no section of the hot tap fitting will be over a circumferential field weld joint.

Soil will be excavated from underneath the pipeline at the chosen location to allow unrestricted installation of the tools. The remote operating vehicle will be utilized to remove soil from underneath the pipeline and create a hole or an exposed area. The pipeline will be cleaned using a brush and/or a low pressure water jet powered by the remote operating vehicle.

Once the foregoing preliminary procedures have been completed, a measurement tool will be lowered from the surface on to the pipeline in order to check circumferential roundness or ovality of the pipeline while simultaneously checking the straightness of the pipeline. The measurement tool will be powered by the remote operating vehicle.

A pair or more of pipe lift frames will be lowered from the surface to straddle the pipeline, the lift frames spaced as appropriate, along the pipeline axis, and on opposing sides of the hot tap location. Each pipe lift frame will include a pair of platforms containing screw or hydraulic mechanisms, located on each side of the pipeline, which are used to position and raise or lower a pipeline lifting tong.

Between the pair of platforms is a transverse beam from which extends the pipe tong. Each pipe tong may be positioned transversely to the axis of the pipeline and lowered onto the pipeline using the hydraulic system from the remote operating vehicle or a mechanical screw. Each lift platform may also include a mud mat which is adjustable with respect to the lift frame.

The lift frames will position the pipeline to a desired height in an even and incremental sequence by the aforementioned mechanical or hydraulic mechanisms contained in each of the platforms thereby creating an upward net force. The mechanisms are powered by the remotely operated vehicle (ROV) in the same manner as the aforementioned tong and its associated manipulation mechanism. Subsequently, the pipe tongs are mechanically locked onto the pipeline in an elevated position.

After lifting the pipeline in preparation for installation of the hot tap fitting clamp assembly, around the pipeline, the measurement tool will again be utilized to check the circumferential roundness or ovality and straightness of the pipeline.

In the event the pipeline contains a longitudinal weld and it is deemed necessary to remove the protruding surface of the weld, a weld bead removal tool will be lowered from the surface and landed onto the pipeline. The remote operating vehicle will be docked into the weld bead removal tool and hydraulic and control connections will be made. The weld bead removal tool will remove any protrusion of the longitudinal weld by machining a section of the weld along the pipeline.

In the next step of the sequence of the invention, a hot tap fitting clamp assembly and its associated orientation frame will be lowered from the surface and landed on top of the pipeline at the designated location between the lift frames. The hot tap fitting clamp assembly comprises the piping components for the lateral branch connection: a clamp with a branch port and with associated fasteners or studs, a valve having opening and closing features for the branch connection, and a connector hub for connection of the hot tapping machine and subsequently the lateral pipeline. These piping components are preassembled prior to being placed in the fitting and orientation frame.

The orientation frame includes a plurality of mud mats to support the hot tap fitting clamp assembly and hot tapping machine in soft soils. These mud mats can be extended and retracted by either hydraulic cylinders or mechanical screws so as to level the frame and support the weight of the equipment. The mud mats may be articulated to aid in the transportation and launching of the orientation frame.

Using the remote operating vehicle and its hydraulic system, the diverless hot tap fitting clamp assembly and orientation frame will be leveled.

In a preferred embodiment, the fitting and orientation frame includes four uprights, each of which is parallel to the other and each of the uprights are perpendicular to the axis of the pipeline. The orientation frame includes level indicators to measure the tilt, if any, and make leveling adjustments to the frame.

The orientation frame houses the hot tap fitting clamp assembly on supports designed to not obstruct the operation of closing the clamp body around the pipeline or rotation of the assembly about the pipeline. The hot tap fitting clamp assembly is made to surround the pipeline, in the closed position, by operating its own hydraulic pistons, or mechanical screws.

A plurality of guide posts are lowered from the surface onto the uprights of the orientation frame. The guide posts serve to guide and retain the hot tapping machine to be described herein. The guide posts are different lengths to facilitate the landing of the equipment.

The hot tap fitting clamp will be closed to surround the pipeline using hydraulic pistons or mechanical screws attached to the body of the clamp powered and controlled by the remote operating vehicle. The remote operating vehicle will also position the fasteners or studs for securing the body seals of the clamp. A torque tool or stud tensioning assembly will be lowered onto the guide posts, if not preinstalled with the hot tap fitting clamp assembly. The remote operating vehicle will be docked into the torque tool or stud tensioning assembly. Studs on the fitting clamp will thereafter be tightened by said torque tool or stud tensioning assembly. Upon completion of this operation, the torque tool or stud tensioning assembly will be retrieved to the surface.

Using a hydraulic piston and pinion arrangement, or other hydraulic mechanism for imparting a rotary motion, the hot tap fitting clamp assembly, which includes a valve and connector hub for the branch connection, is rotated from a side orientation to an upright position with respect to the pipeline. In the upright position, the valve will be vertical and parallel to the uprights and the guide posts. The remote operating vehicle will actuate a grip and seal mechanism in the hot tap fitting clamp to lock the hot tap fitting clamp and to make a seal with the pipeline. Finally, the pipeline will be lowered by the pipe lift frames until the pipeline is supported on the orientation frame.

The next operation describes a diverless method to connect the hot tapping machine to the hot tap fitting clamp assembly. The hot tap machine and its accompanying frame will be lowered onto the orientation frame through the use of the guide posts. The hot tap machine will be brought into position above and in approximate alignment with the lateral connection hub that is part of the hot tap fitting clamp assembly. The next operation involves the precision alignment of the connecting hubs (one on the hot tap fitting clamp assembly and one on the hot tap machine) and the landing of sealing surfaces so as to avoid damage in consideration of the weight of the equipment. The connectors are designed with various tapered surfaces to align the sealing faces as they are positioned for contact by the force of the weight of the top connector. An integral part of the connectors are hydraulic cylinders that control the final make-up of the two hubs. Additional hydraulic cylinders are used to latch and unlatch the hubs.

An alternate method for lowering the hot tap machine onto the connecting hub would involve a plurality of pistons, or other hydraulic mechanisms, attached to the hot tap orientation frame and the hot tapping machine which will control the height and rate of descent of the hot tap machine with respect to the hot tap frame. Once the hot tap assembly has been set in position using the guide posts, the hot tap machine will be carefully lowered through use of the pistons, or other hydraulic mechanisms, on the hot tap frame and a seal will be made with the hub of the connector on the hot tap fitting clamp assembly. This method would allow for other styles of connectors that do not have the integral controlled landing features to be employed.

The hot tap machine will tap the pipeline using its cutter mechanism by passing through the valve, in its opened position, and engaging the pipeline. Thereafter, the cutter of the hot tap machine and pipe coupon will be retracted and the valve will be closed.

The pipe lift frames will then lower the pipeline and the accompanying fitting clamp back to the sea floor.

A series of steps will be taken to connect a production branch line or extension of another pipeline to the lateral hub of the hot tap fitting clamp assembly on the existing pipeline. With the production branch line terminating in a second production hub and valve assembly, the distance and relative orientation between the hot tap fitting clamp assembly as assembled on the pipeline and with the upright valve and connector hub on the production branch line will be measured. A pipeline jumper which contains mating connector hubs for connection at each end will be built to match the dimensions. The jumper is then lowered and guided by the remote operating vehicle onto the mating hubs at each respective end by the methods previously described in the setting of the hot tapping machine. The jumper will be lowered until the sealing faces meet. After the jumper is connected, the various guide posts and the pipe lift frames will. be retrieved to the surface.

DETAILED DESCRIPTION OF THE PREFERRED EMBODIMENTS

Figure 1:
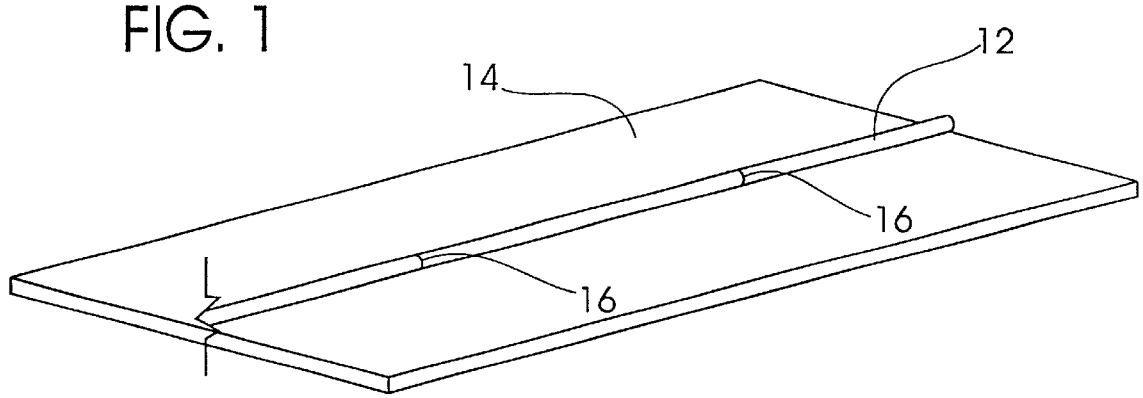
FIG. 1 illustrates an underwater deep sea pipeline residing on a sea floor or sea bed prior to application of the present invention.

Referring to the drawings in detail, FIG. 1 illustrates a section of an underwater deep sea pipeline 12 residing on and supported by a floor 14 of the sea. FIG. 1, thus, illustrates the pipeline 12 prior to application of the process and pieces of the present invention. The pipeline 12 will consist of a number of sections joined together with circumferential welds 16. Depending on the size of the pipeline and other factors, longitudinal welds (not seen) may also be encountered. Deep water locations (such as depths over 1,000 feet) are known to produce high pressure conditions external to the pipeline, relative to the internal pressure of the line. The present invention is adaptable to various diameter pipelines, where internal pressure is above or below ambient pressure, but is particularly useful for 10" to 20" diameter pipelines.

Figure 1A:
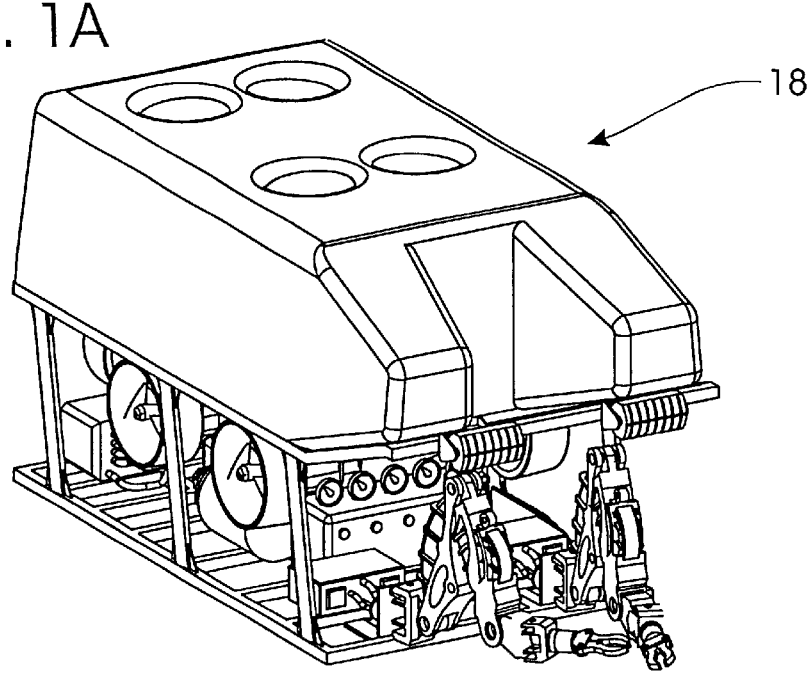
FIG. 1A illustrates a remote operating vehicle that may be utilized in the process of the present invention.

A remote operating vehicle or ROV 18, such as shown in FIG. 1A, will assist in performing many of the steps or operations to be described in the present invention. The remote operating vehicle 18 will be controlled and powered from the surface. During the initial stages of the process of the invention, the pipeline 12 will be located and a comprehensive series of procedures will be performed. A preliminary visual condition inspection will be conducted through use of ROV cameras. The bottom conditions will be reported, the visibility surrounding the pipeline will be reported, the type of soil on the sea floor will be reported, the water current: will be reported and the depth of the pipeline will be reported. Additionally, the location of: circumferential pipeweld seams and longitudinal welds, if any, will be reported. The condition of any coating on the pipeline, such as concrete, polyethylene, fusion bonded epoxy, will also be reported.

The pipeline 12 will be inspected in the area of interest and a pipe section will be identified having a weld seam, if applicable, at a suitable position. If the pipe contains a longitudinal weld or seam, the location of the seam will be identified. It is preferred to select a location where a weld seam is not cut out with the hole being bored into the pipe during the tapping operation. For seamless pipe, this step is ignored. Additionally, a location will be identified away from any circumferential weld so that no section of the hot tap fitting installed will be over a circumferential field weld joint. Accordingly, the hot tap procedure to be described will not interfere with any such longitudinal weld.

A circumferential field joint 16 will be located and then a location along the pipeline 12 will be located away from the circumferential weld so that there will be no section of the hot tap fitting installed over the circumferential field joint weld.

At the outset, soil will be excavated from underneath the pipeline 12 to allow unrestricted installation of tools to be described herein. In one procedure, the remote operating vehicle 18 will employ a pump to create a jet of sea water to remove soil from underneath the pipeline and create a hole or an exposed area. This may be accomplished in several ways such as by pumping away or sucking away the soil.

Thereafter, the pipeline 12 in a selected location will be cleaned using a brush or a low pressure water jet powered by the remote operating vehicle 18. In some instances, external protective pipeline coating, such as fusion bonded epoxy and the like, may be required to be removed prior to proceeding.

Lee (U.S. Pat. No. 4,880,335) discloses one system of subsea removal of cement or concrete coatings from pipes. Other types of known coating removal would, of course, be possible within the scope of the invention.

Figure 1B:
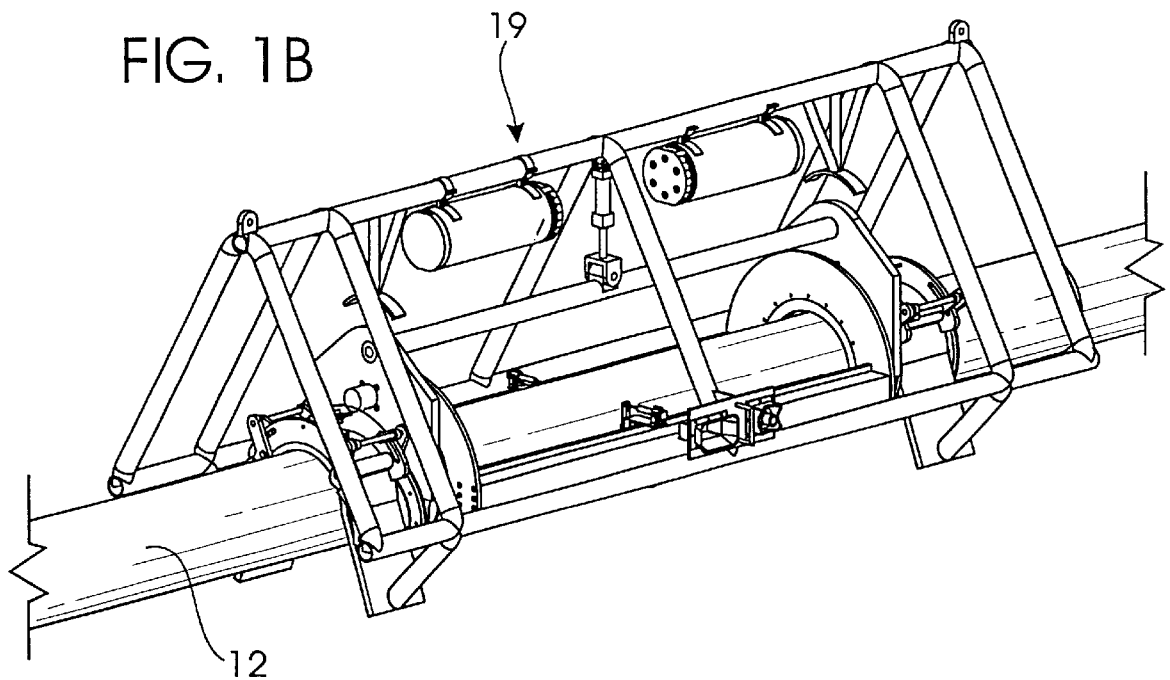
FIG. 1B is a perspective view of a measurement tool which is used as a part of the process of the present invention.

Once the foregoing preliminary procedures have been completed, a measurement or metrology tool 19, as seen in FIG. 1B, would be lowered onto the pipeline 12 at the chosen location in order to inspect the circumferential roundness or ovality of the pipeline while simultaneously checking the straightness of the pipeline. The measurement tool 19 is operated by the remote operating vehicle 18. The tool 19 moves a probe and camera back and forth axially as well as around circumferentially on the pipe surface to measure ovality and check for surface imperfections. If the pipeline is determined to be within the tolerances of roundness and straightness, the measurement tool may be removed and returned to the surface. Alternatively, the measurement tool might be left on the pipeline 12 for use at a later sequence in the operation.

If the pipeline fails the roundness and straightness test, the measurement tool will be axially moved to another location on the pipeline 12 and the measurement test will be re-performed.

Figure 2:
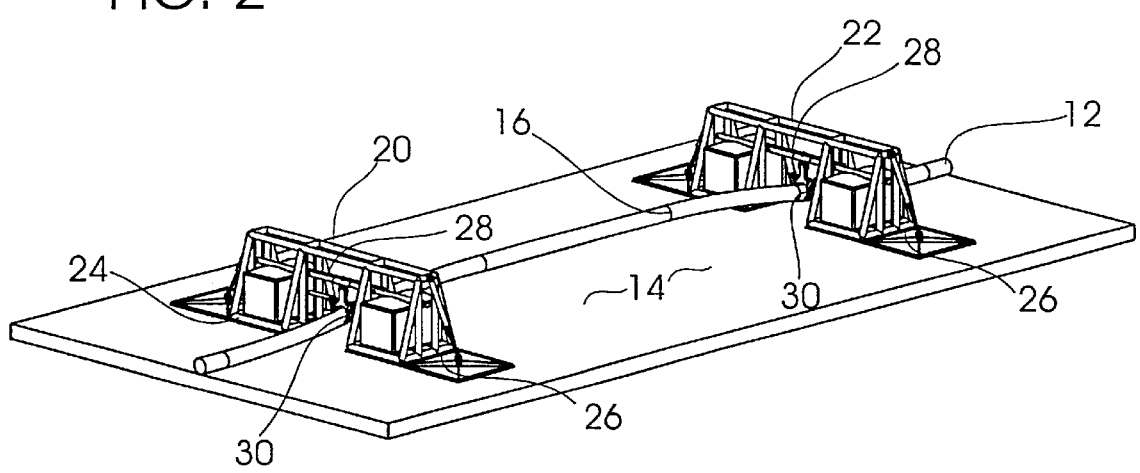
FIG. 2 illustrates installation of a pair of pipe lift frames, part of the process of the diverless hot tap system of the present invention.
Figure 2A:
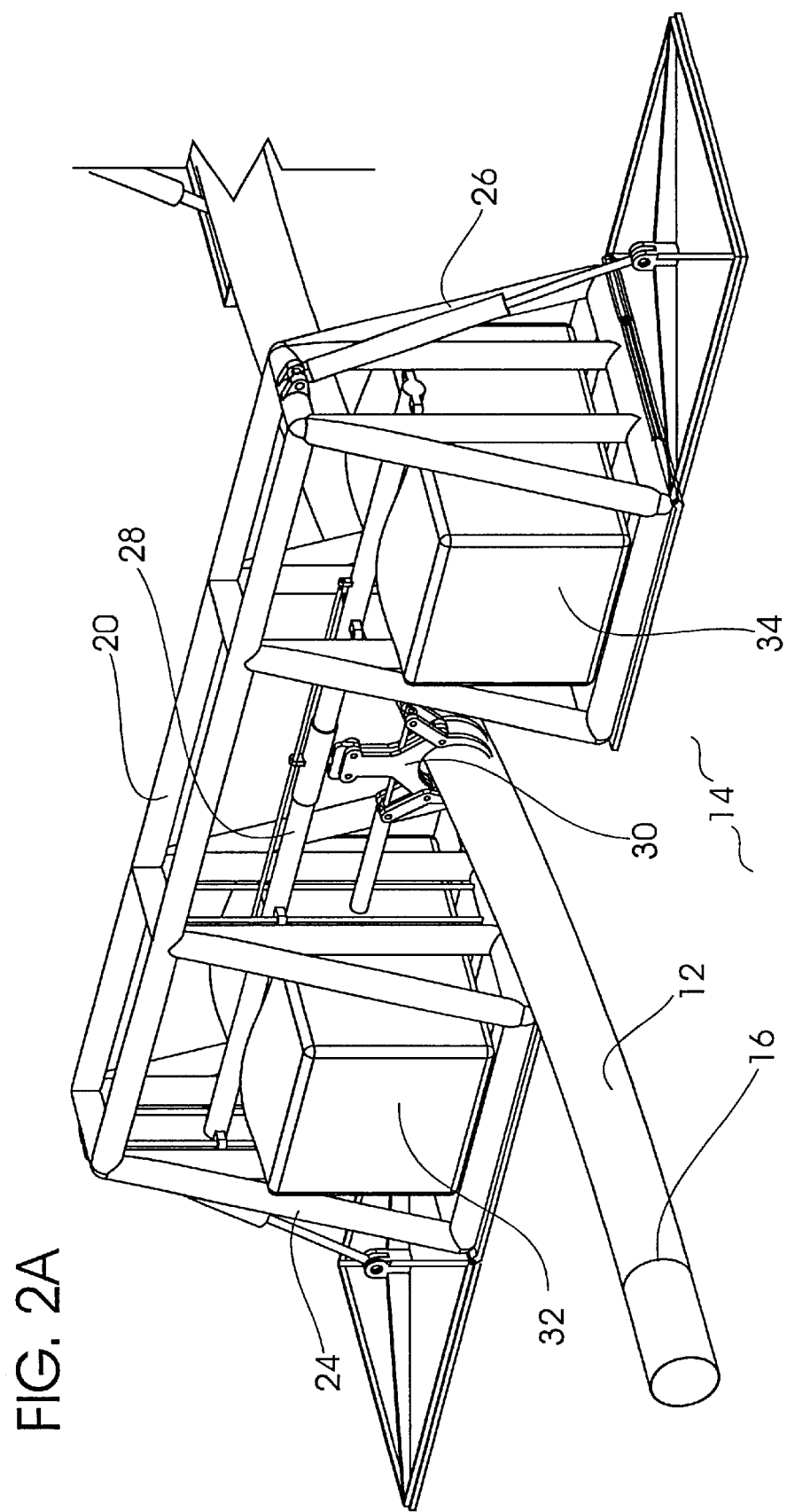
FIG. 2A is an enlarged view of one of the pipe lift frames, which is part of the process of the present invention.

Once a suitable location on the pipeline 12 has been determined, a plurality of pipe lift frames, 20 and 22, will be lowered from the surface to straddle the pipeline as best seen in FIG. 2. FIG. 2A shows an enlarged drawing of one such pipe lift frame 20.

In the present embodiment, at least a pair of pipe lift frames 20 and 22 will be utilized. In some applications, four pipe lift frames (not shown) will be utilized to achieve the desired result. Each pipe lift frame 20 and 22 will include a pair of opposed support platforms 24 and 26 which will be lowered on opposite sides of the pipeline 12. Each platform contains hydraulic or screw mechanisms. Between the platforms 24 and 26 is a transverse beam 28 from which extends a pipe tong 30.

Each pipe lift platform 24 and 26 may include a mud mat, lift bags (not shown in FIGS. 2 and 2A) or other methods of support.

The pipe tongs 30 may be moved transversely or perpendicular to the axis of the pipeline 12 and lowered around the pipeline 12 using the hydraulic system from the remote operating vehicle 19. The lift frames 20 and 22 will be brought to a desired height in an even and incremental sequence by the lifting device 32 and 34 contained in each of the platforms 24 and 26. In one preferred method, the hydraulic devices include bags which are actuated with hydraulic power supplied by the remote operating vehicle 18 (not shown in FIG. 2). Subsequently, the pipe tongs 30 are mechanically locked onto the pipeline 12 in the elevated position.

Once the pipe lift frames 20 and 22 have been installed as described, the measurement tool 19 will then again be utilized to check the circumferential roundness or ovality and straightness of the pipeline.

If the measurement tool has not remained on the pipeline 12, it will be reinstalled on the pipeline 12 between the lift frames 20 and 22. The remote operating vehicle will be docked into the measurement tool and the hydraulic and electronic control connections will be made. The roundness or ovality and straightness of the pipeline will again be checked in order to determine any effects of the foregoing pipe lifting on the pipe. If the pipeline 12 is within the desired tolerances, the measurement tool 19 will be removed. If the pipeline fails the check, the pipe lifting frames may be readjusted and a new location chosen for the forthcoming hot tap.

Figure 3:
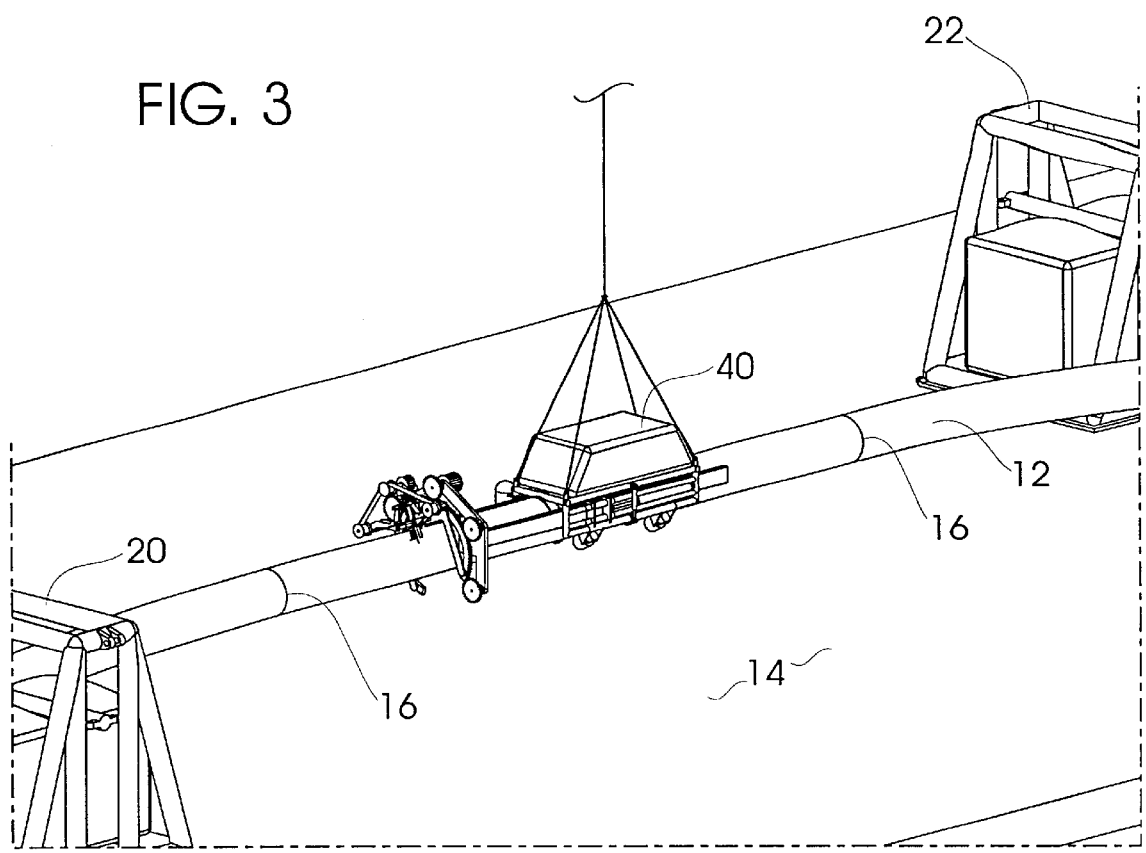
FIG. 3 illustrates a weld bead removal tool on the pipeline, which is a part of the process of the present invention.

The next step in the sequence shown in FIG. 3 will only be performed if the pipeline contains a longitudinal weld. If deemed necessary, a weld bead removal tool 40 will be lowered from the surface and landed onto the pipeline 12 as shown in FIG. 3. The remote operating vehicle 18 (not shown in FIG. 3) will be docked into the weld bead removal tool 40 and the hydraulic and control connections will be made. The weld bead removal tool 40 will remove any protruding longitudinal weld by machining the weld bead from the pipeline 12. Thereafter, visual inspection through a camera will be made. Finally, the weld bead removal tool 40 will be removed from the pipeline and returned to the surface. The weld bead removal tool will be used in those instances where a longitudinal weld has been found and the tool must be removed prior to the hot tap to be performed.

In a step to be performed prior to the tapping of the pipeline, a hot tap fitting clamp will be inspected and prepared for operation. The various seals on the hot tap fitting clamp will be checked. The hot tap fitting clamp will also be rigged for vertical orientation.

Figure 4:
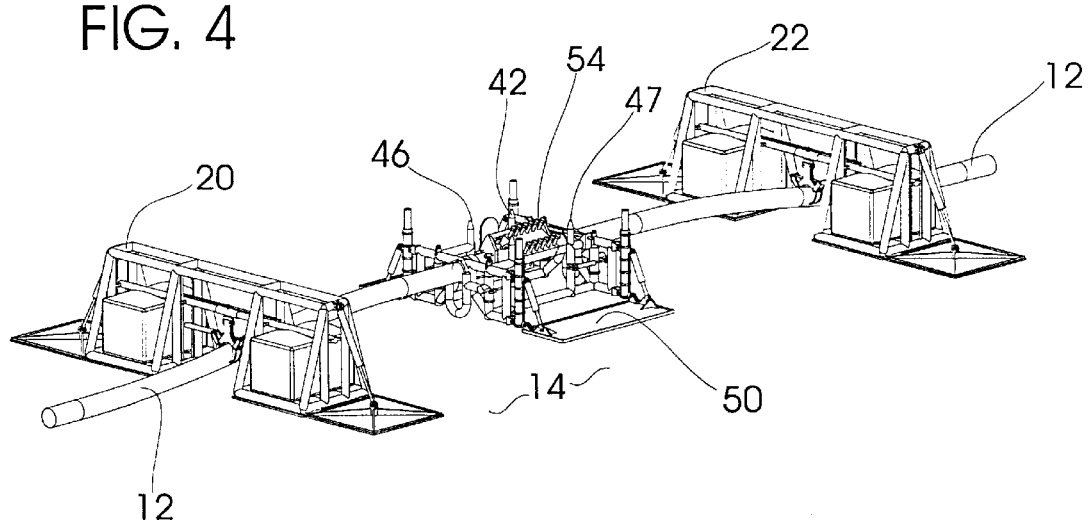
FIG. 4 illustrates installation of an orientation frame containing the assembly of hot tap fitting clamp, valve and connecting hub installed on the pipeline between the pipe lift frames.

The next step in the sequence of the invention is illustrated in FIG. 4. The pipe lift frames 20 and 22 are lowered so that the pipeline 12 will likewise be lowered. A hot tap fitting and its associated orientation frame 48 will be lowered from the surface and landed on top of the pipeline 12 between the pipe lift frames 20 and 22. The frame 48 may include a pair of opposed mud mats 50 (one visible in FIG. 4). The mud mats 50 are movable by hydraulic cylinders between an extended and retracted position. The mud mats will be placed in the retracted position during lowering. The mud mats 50 will be extended and lowered before final touchdown on the sea floor 14. The mud mats 50 will be operated by the remote operating vehicle hydraulic system.

Thereafter, the pipe lift frames 20 and 22 will be raised until the pipeline 12 is fully seated in the saddles of the orientation frame 48. Using the remote operating vehicle hydraulics system, the orientation frame 48 will be leveled. Thereafter, the pipe lift frames 20 and 22 will be locked in place.

In the present embodiment, the orientation frame 48 includes four uprights 42, 44, 46 and 47, each of which is parallel to the other. It will be appreciated that while a plurality of uprights is advantageous, the number is a matter of choice.

The frame 48 also includes an associated hot tap fitting clamp assembly 54. The hot tap fitting clamp assembly comprises the piping components for the lateral branch connection: a clamp with a branch port and with associated fasteners or studs, a valve having opening and closing features for the branch connection, and a connector hub for connection of the hot tapping machine. The hot tap fitting clamp assembly 54 is lowered over the pipeline at the selected location. The fitting clamp 54 is initially closed using its own hydraulic pistons and a plurality of fasteners or studs are pushed in. The remote operating vehicle (ROV) 18 will initially be used to hydraulically close the fitting clamp around the pipeline.

Figure 5:
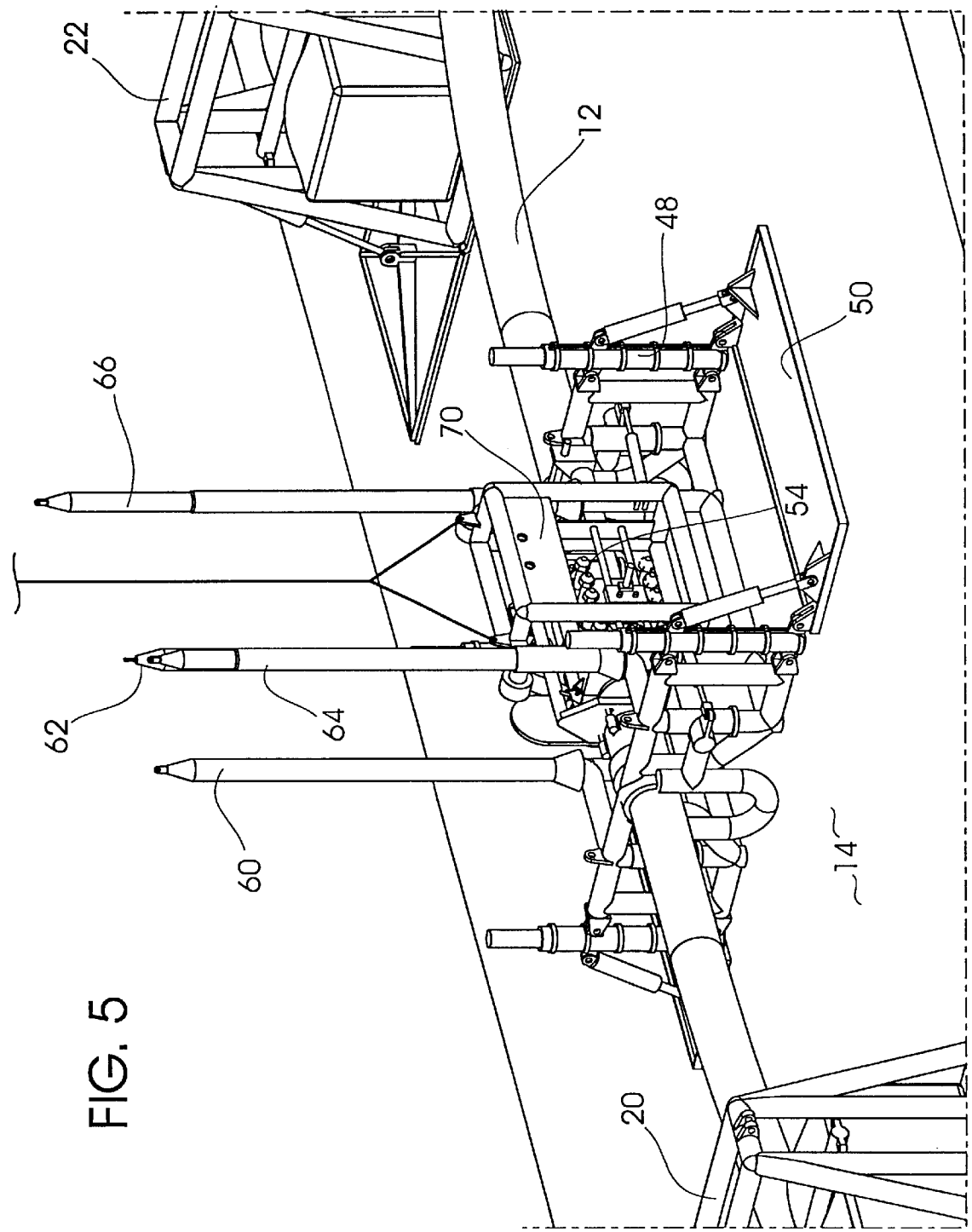
FIG. 5 illustrates installation of the guide posts on the orientation frame and the use of a torque tool assembly to affix the hot tap fitting clamp on the pipeline.

With reference to FIG. 5, either before or after closing the fitting clamp 54, a plurality of guide posts 60, 62, 64 and 66 are lowered from the surface onto the uprights 42, 44, 46 and 47, respectively, of the orientation frame 48 to guide and retain. While the guide posts may be of various configurations, in the present embodiment they have frusto-conical shaped, open bases. The guide posts 60, 62, 64, and 66 are of uneven length allowing for easy landing of equipment. By stabbing one guide post at a time, the remote operating vehicle can guide the equipment into position.

A torque tool or stud tensioning assembly 70 is seen being lowered from the surface into position in FIG. 5. The remote operating vehicle 18 will be docked into the torque tool or stud tensioning assembly 70 and the hydraulic and electronic control connections will be made. The fasteners or studs on the hot tap fitting clamp 54 will thereafter be tightened by the torque tool or stud tensioning assembly. Once this operation has been completed, the torque tool assembly or stud tensioning assembly 70 will be retracted from the guide posts and returned to the surface.

To facilitate the positioning of the hot tap fitting clamp on the pipeline as just described, a lateral connection valve 72 on the fitting clamp assembly 54 will be oriented in a side position. Stated in other words, the connection valve 72 will not be vertical to the sea floor 14.

Figure 6:
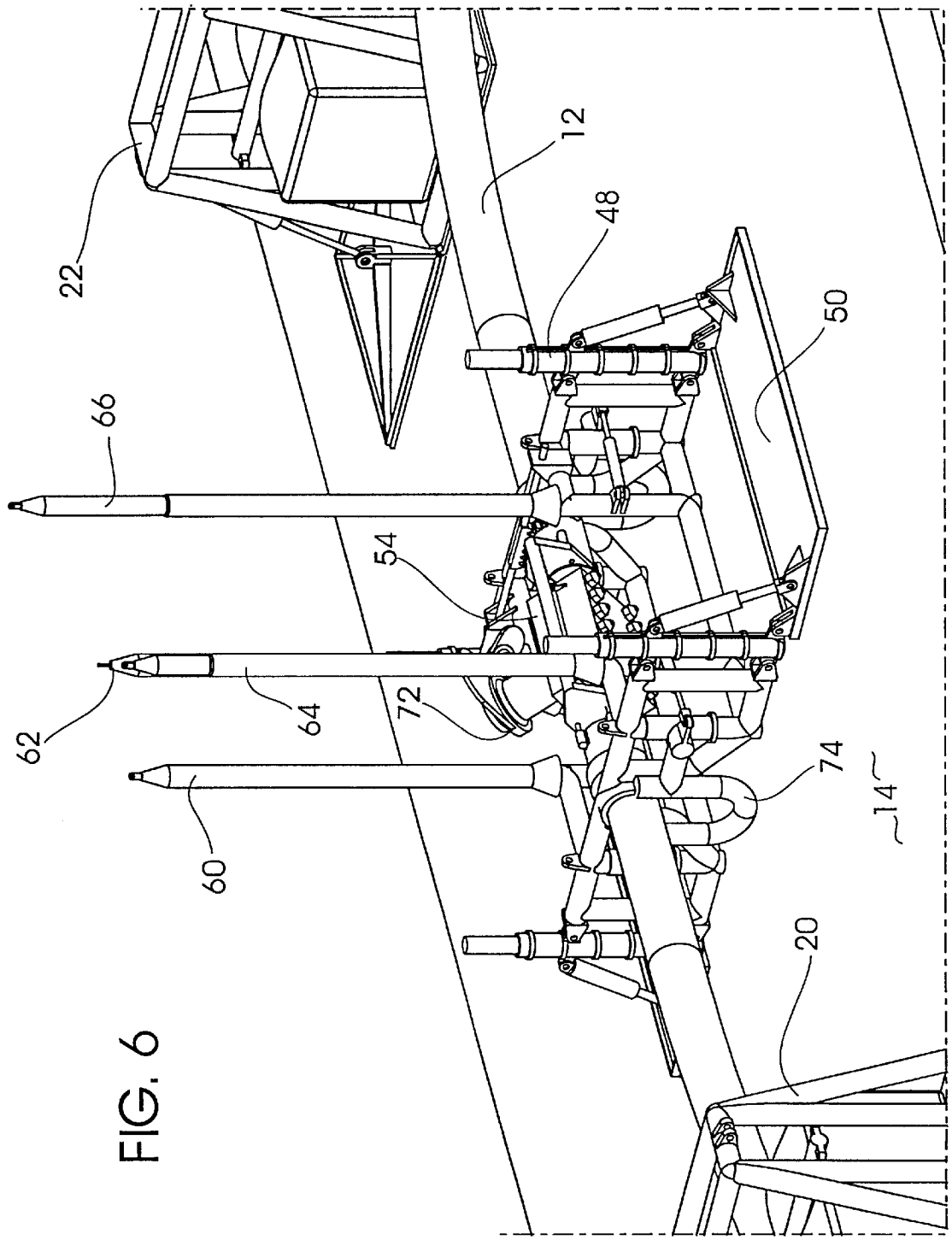
FIG. 6 illustrates the hot tap fitting clamp and its repositioning from a side orientation to an upright orientation.

As shown in FIG. 6, using a hydraulic piston and pinion or rotary actuator arrangement, the fitting clamp 54 will include a connection valve 72 which is rotated approximately ninety degrees (90°) from a side to an upright position. In the upright position, the valve will be vertical to the sea floor and parallel to the uprights and the guide posts. The hot tap fitting clamp and valve assembly will contain level indicators to verify that the valve is vertically oriented. These level indicators may be electronic transponders and/or visual scale measurement devices.

Thereafter, the remote operating vehicle 18 will actuate a grip and seal mechanism between the fitting clamp and the pipeline 12. The remote operating vehicle (ROV) will be capable of monitoring grip displacement indicators and the pressure. The remote operating vehicle 18 will hot stab into a test port and pressurize it to a predetermined pressure to verify a seal between the fitting clamp 54 and the pipeline 12. Accordingly, the seal integrity is tested. A relative vacuum/pressure test is performed using a remote operating vehicle tool. When the test is; performed with the valve closed, it verifies the integrity of the seal between the pipeline 12 and the fitting clamp 54, the longitudinal seals along the clamp body, and the seal of the valve for pipeline pressure. In the case of a vacuum test, the external pressure of the water depth is verified.

Figure 6A:
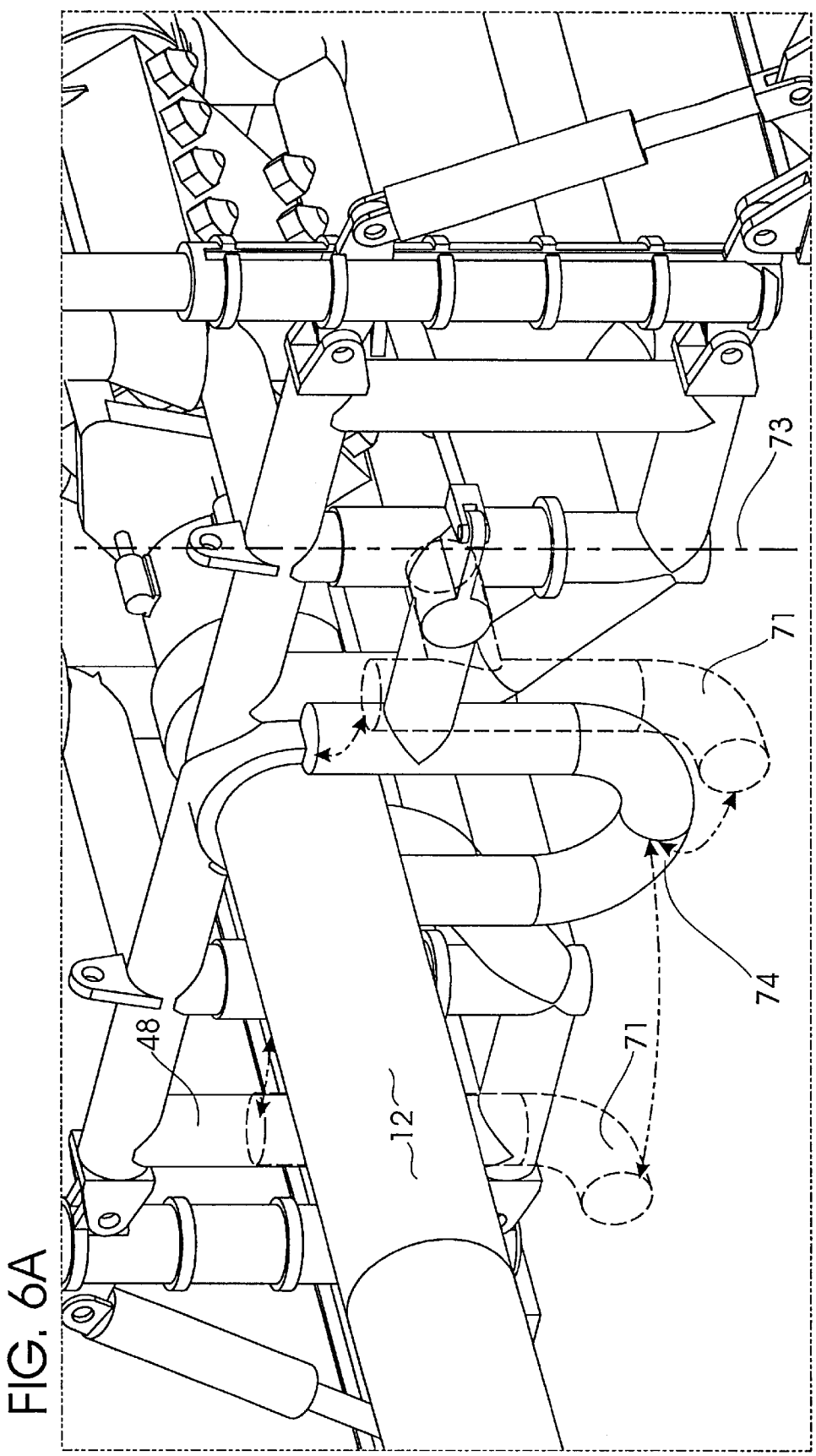
FIG. 6A illustrates an enlarged view of the orientation frame to show movement of its pipe supports.

Finally, as illustrated in FIG. 6A, opposed pipe supports 71 rotate about axes 73 (shown by dashed lines) to close to form U-shaped piece 74, the pipeline 12 will then be lowered by the pipe lift frames 20 and 22 until the pipeline 12 is supported on the orientation and fitting frame 48. The U-shaped piece 74 receives and supports the pipeline 12.

Figure 7:
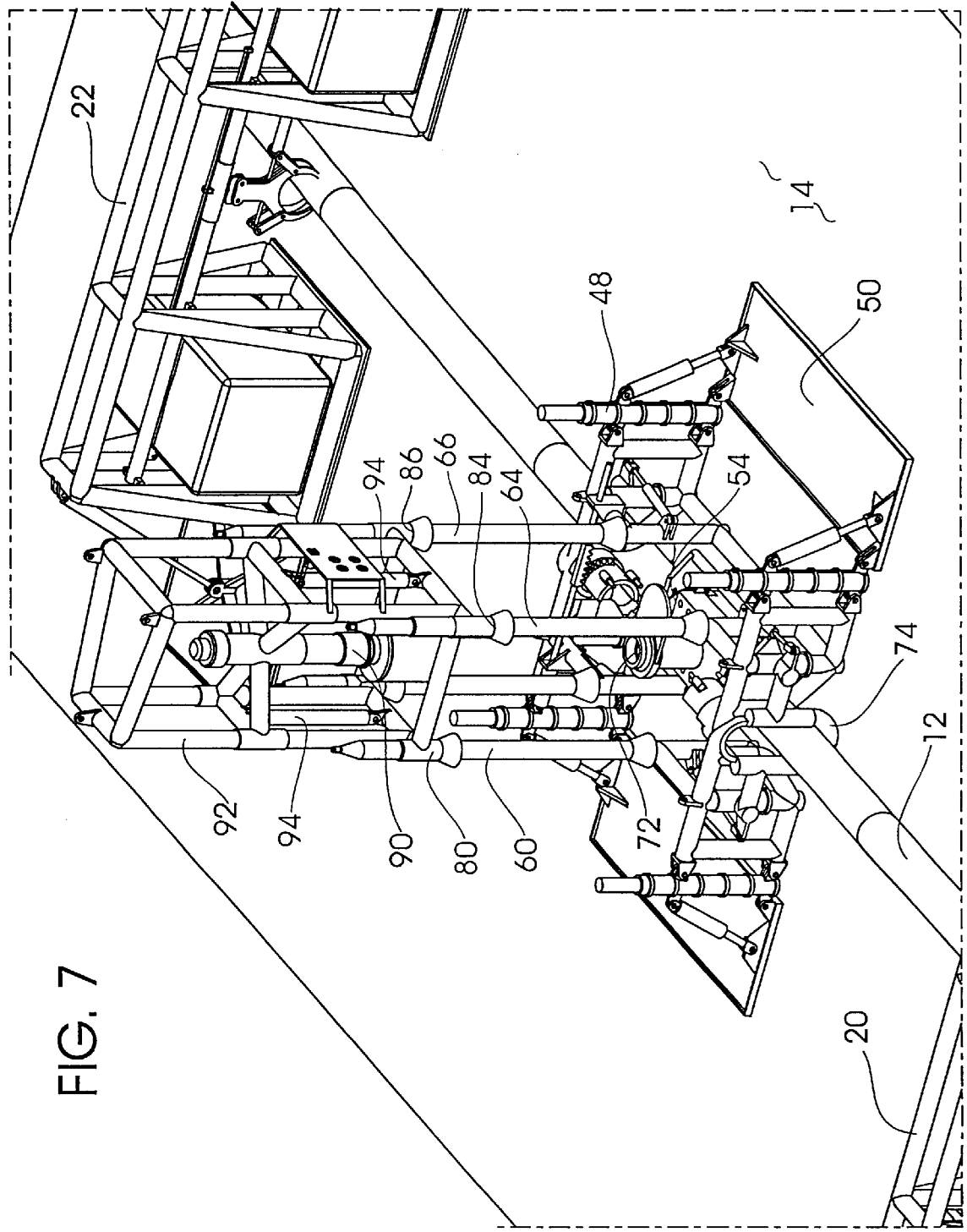
FIG. 7 illustrates the lowering of a hot tap machine and accompanying frame onto guide posts of the orientation frame.

The next step in the sequence of the present invention is illustrated in FIG. 7. With the pipeline 12 lowered and supported by the orientation frame 48, a hot tap machine 90 and accompanying frame 92 (forming a hot tap assembly) is lowered from the surface onto the orientation frame 48 through use of the guide posts 60, 62, 64 and 66. The hot tap machine 90 and its frame 92 have been previously rigged together. The same guide post arrangement is used as described previously. The hot tap frame 92 includes receptacles 80, 82, 84 and 86 which are received on the guide posts 60, 62, 64 and 66. While the receptacles 80, 82, 84 and 86 may take various forms, in the present preferred embodiment, they are frusto-conical with open bases. The hot tap frame 92 may include a plurality of pistons or mechanical screws 94 which control the level of the hot tap machine 90 with respect to the frame.

Figure 8:
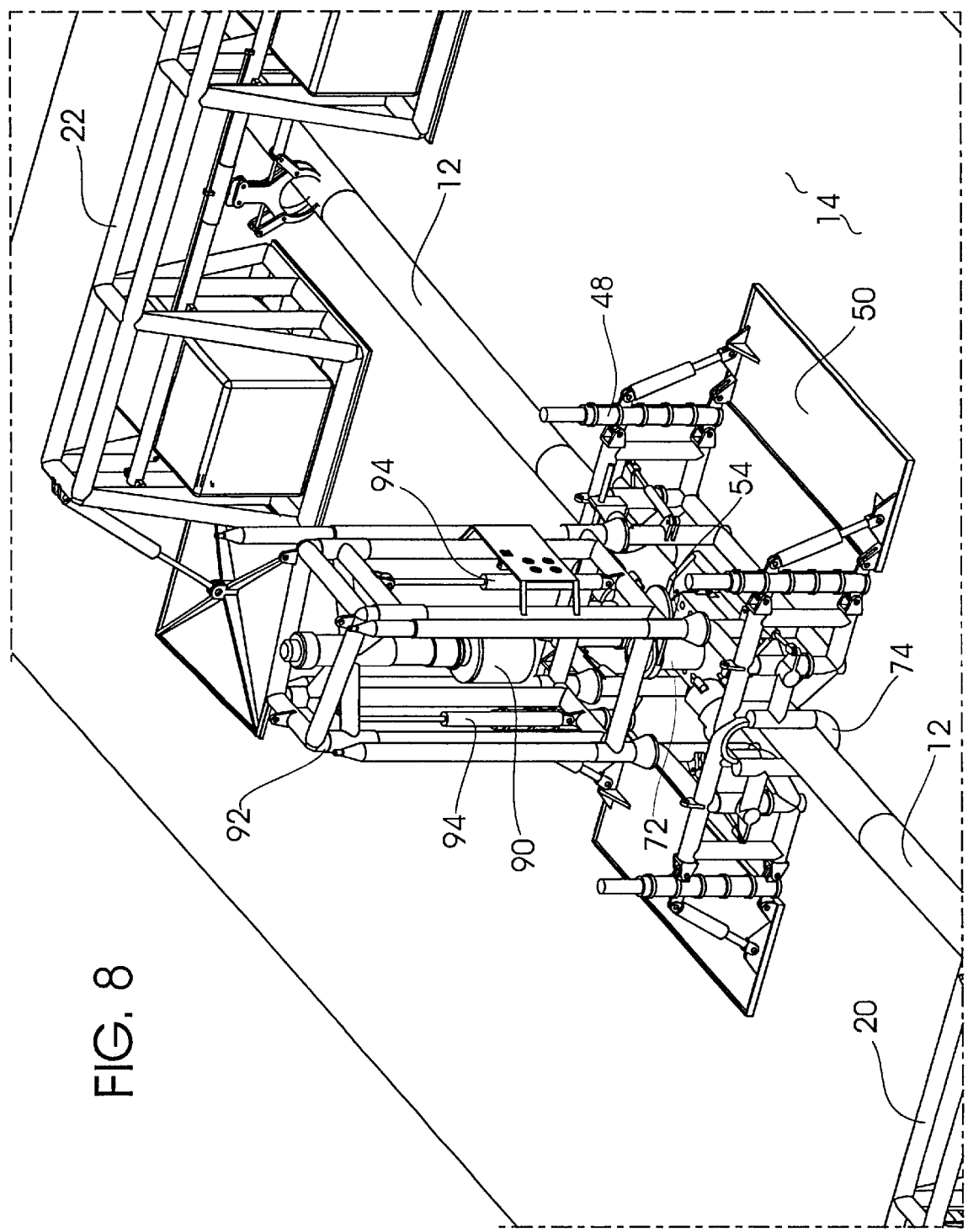
FIG. 8 illustrates the initial alignment of the connector hub on the hot tap fitting machine and the hub on the lateral connection of the hot tap fitting clamp assembly.

As seen in FIG. 8, the hot tapping assembly will land on the orientation frame 48. Initially, no seal is made so that the hot tap machine 90 is prevented from accidentally being rammed against the fitting clamp 54. In FIG. 8, the hot tap machine 90 is aligned with the connection valve 72.

Figure 9:
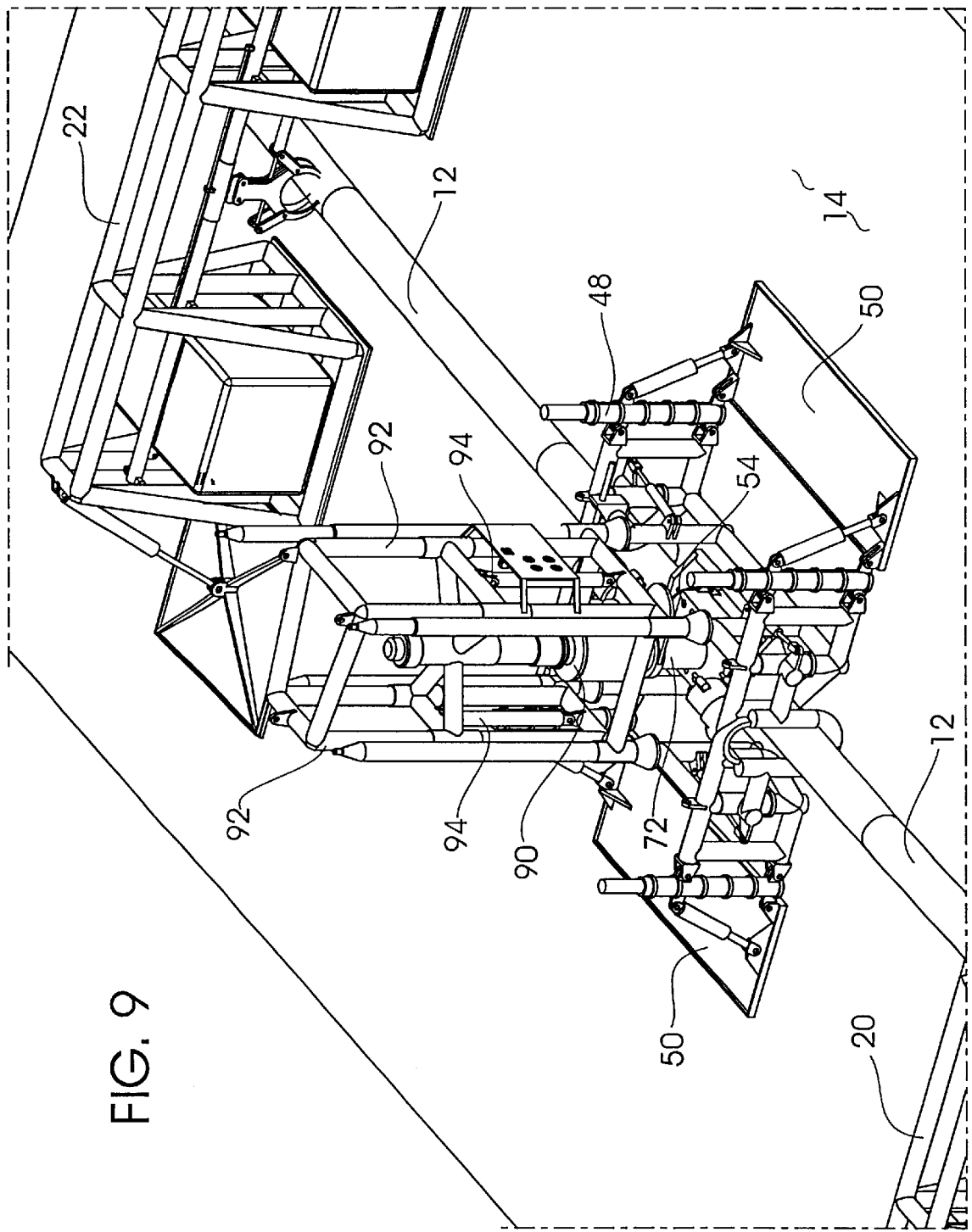
FIG. 9 illustrates the final alignment utilizing hydraulic pistons or other hydraulic mechanism, on the hot tap frame to lower the hot tapping machine onto the hub of the hot tap fitting clamp assembly.

Thereafter, as seen in FIG. 9, the pistons 94 on the hot tap frame 92 will be activated so that the hot tap machine 90 will be carefully lowered and a seal will be made between the hot tap machine 90 and the fitting clamp 54. The integrity of the seal will then be tested. If the aforementioned pressure test is conducted with the valve open, it tests the integrity of the connection between the hot tap machine 90 and fitting clamp 54 as well. The test medium is not water and is selected to avoid hydrate formation which occurs by a meta-stable combination of natural gas liquids and water at the ambient pressures and temperatures. The test medium utilized could be any of several different methods, such as glycol or methanol. It is introduced to the cavitie(s) by means of a low pressure pump which circulates inhibitor/test medium into the cavitie(s) and takes seawater returns into a holding tank. Once the seawater has been displaced by the inhibitor/test medium, the pressure test is conducted. The test is conducted by connecting a high pressure/vacuum pump to a cavity in the hot tap machine body. The pump will pressurize the cavity between the top of the ball-valve ball and the tap machine. A successful test verifies integrity of the seal between the hot tap machine and the male hub on the hot tap fitting. The ball valve is then opened and the test is repeated. A successful test verifies the sealing integrity of the entire system. The entire process is repeated with the pump in the vacuum mode. This verifies integrity of the sealing system when the hydrostatic (ambient) pressure is greater than the pipeline pressure.

After a good test is attained, the tapping will proceed. The remote operating vehicle 18 will be docked into the control panel of the hot tap machine 90 and hydraulic and electronic connections made. The hot tap machine 90 will tap the pipe 12 using its cutter mechanism (not visible). Thereafter, the cutter mechanism and pipe coupon will be retracted through the valve 72 and the valve will be closed. If deemed necessary, the integrity of the seal of the valve will be verified by testing on the external pressure side of the valve (hot tap fitting machine side) with the valve in the closed position.

Finally, the hot tap machine 90 and its accompanying frame 92 will be raised and recovered to the surface in a reverse procedure. The entire procedure is performed while the pipeline is operational. The internal pressure of the pipeline may be significantly above or in deep sea conditions, below, ambient pressure.

If external pressure exceeds the internal pipeline pressure, it will be necessary to break the seal by pressuring the connection with the valve closed. The internal pressure would be raised to at least the external pressure so that there would be no external forces acting on the seal to prevent disconnection of the hot tapping machine.

The hot tap fitting clamp 54 is then released from the uprighting mechanism. Thereafter, the pipe lift frames 20 and 22 will lower the pipe 12 and the accompanying hot tap fitting clamp assembly back toward the sea floor 14. The weight of the pipeline 12 and the fitting clamp 54 are taken up by the orientation frame 48. Accordingly, the weight will not be distributed on the hot tap fitting or on the pipeline. The orientation frame 48 is designed with sufficient dimensional tolerances so as to provide the required flexibility for the connection of the lateral pipeline and also provide support for the weight of the connecting pipeline in soft soils.

Figure 10:
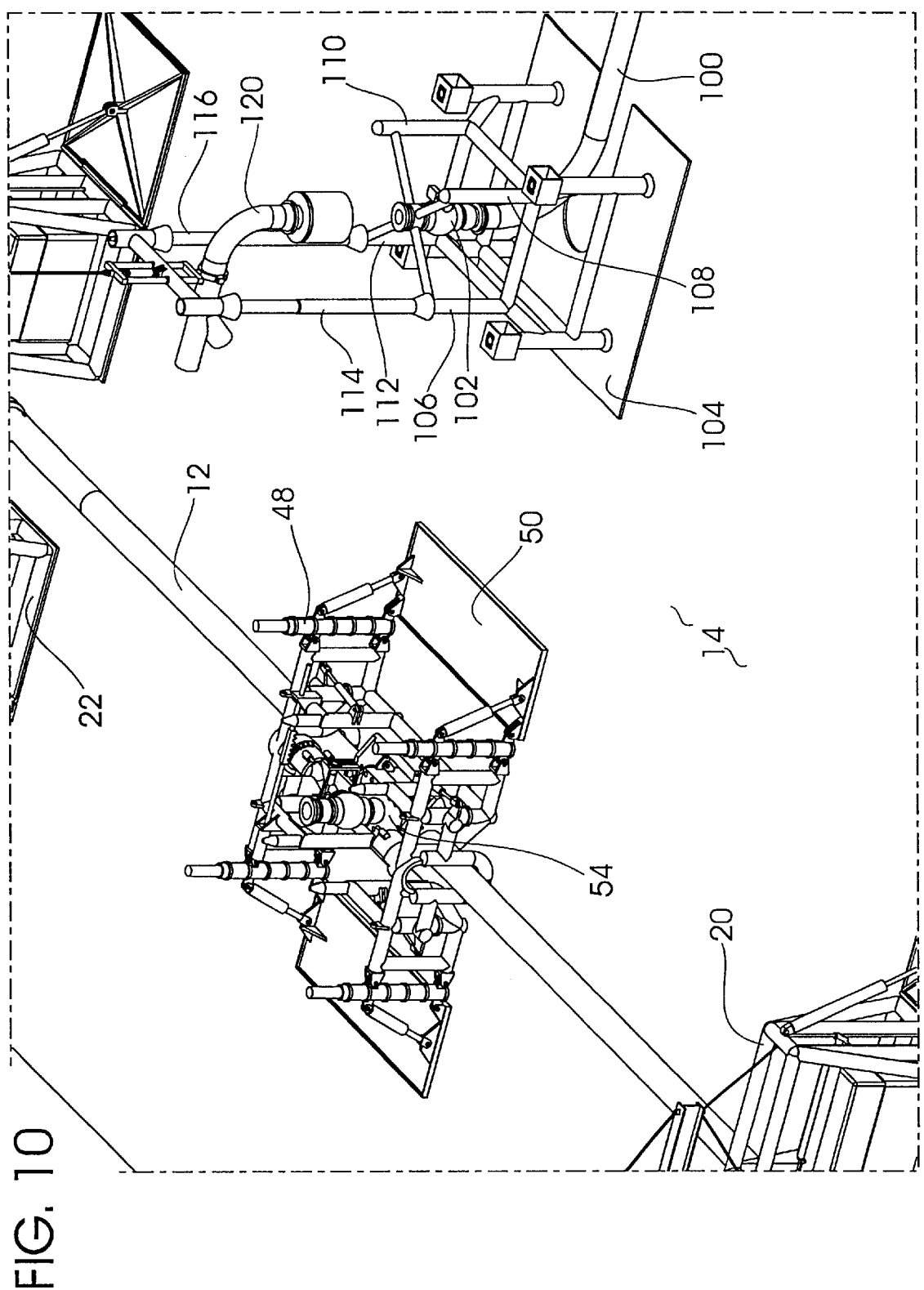
FIG. 10 illustrates a production line and terminating production hub which will be connected to the pipeline.

A series of steps will next be taken to connect a production branch or other pipeline to the existing pipeline 12. In a preferred example to be discussed herein, a new production line 100, as seen in FIG. 10, is tied in to the pipeline 12. The production line 100 terminates in a valve or upright production hub 102. The distance or relative orientation between the hot tap fitting as assembled and the valve hub 102 on the production line is measured.

The pipe lift frames 20 and 22 may be removed at this time or, alternatively, may be removed at the end of the procedure.

Figure 11:
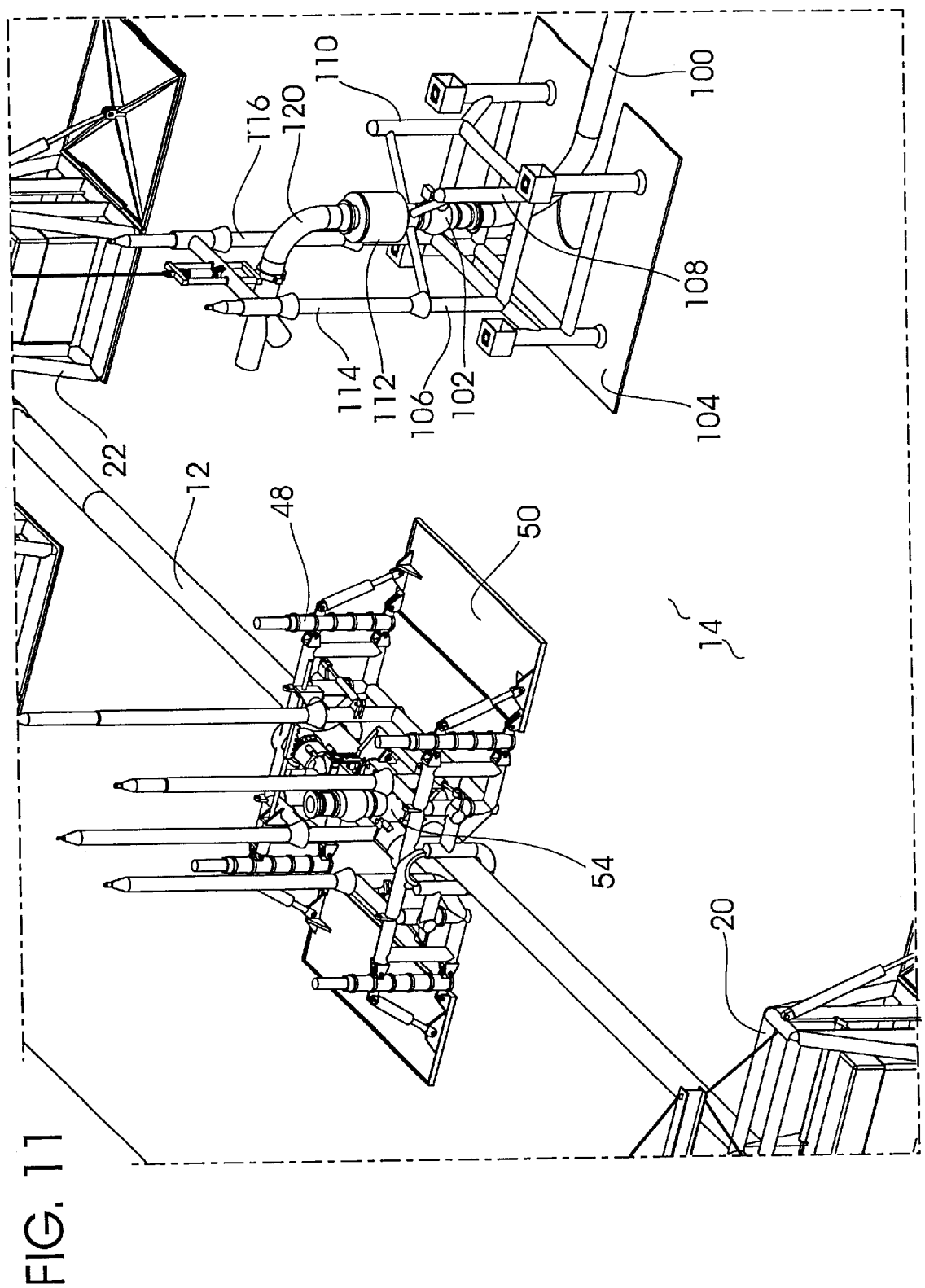
FIG. 11 illustrates the attachment of a pig catcher or pig launcher to the production hub prior to connection of the production line to the pipeline.

In FIG. 11, a pig catcher 120 is guided onto the production hub so that the production line 100 may be pigged prior to completion, all as known in the art. A pair of guide posts 114 and 116 are lowered on the uprights.

Figure 12:
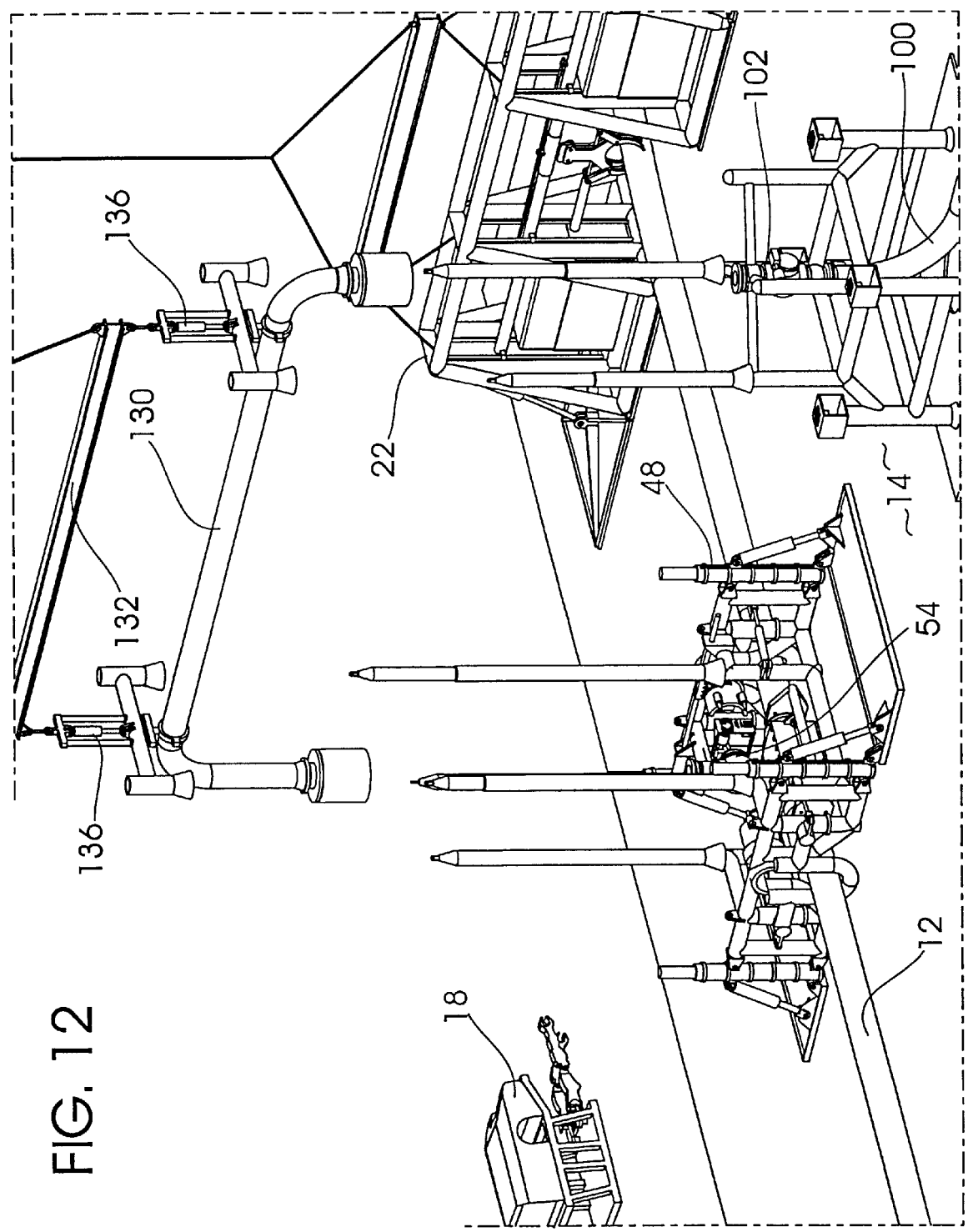
FIG. 12 illustrates lowering of a jumper which is made to span between the production hub and the fitting clamp.

With reference to FIG. 12, a jumper 130 is built to match the measured dimensions. The jumper 130 will be filled with methanol or glycol or a hydrate-inhibition fluid prior to being deployed subsea. The jumper 130 is then lowered and guided by the remote operating vehicle 18 using techniques for setting jumpers previously described. As seen in FIG. 12, the jumper assembly 130 is held by jumper frame 132 and is lowered on to male end connectors (one at the connection for the hot tap and one on the lateral pipeline sled structure). The connecting devices on the jumper contain hydraulic pistons to land the female collet connector on the sealing faces in a method to prevent damage to the sealing faces.

Figure 13:
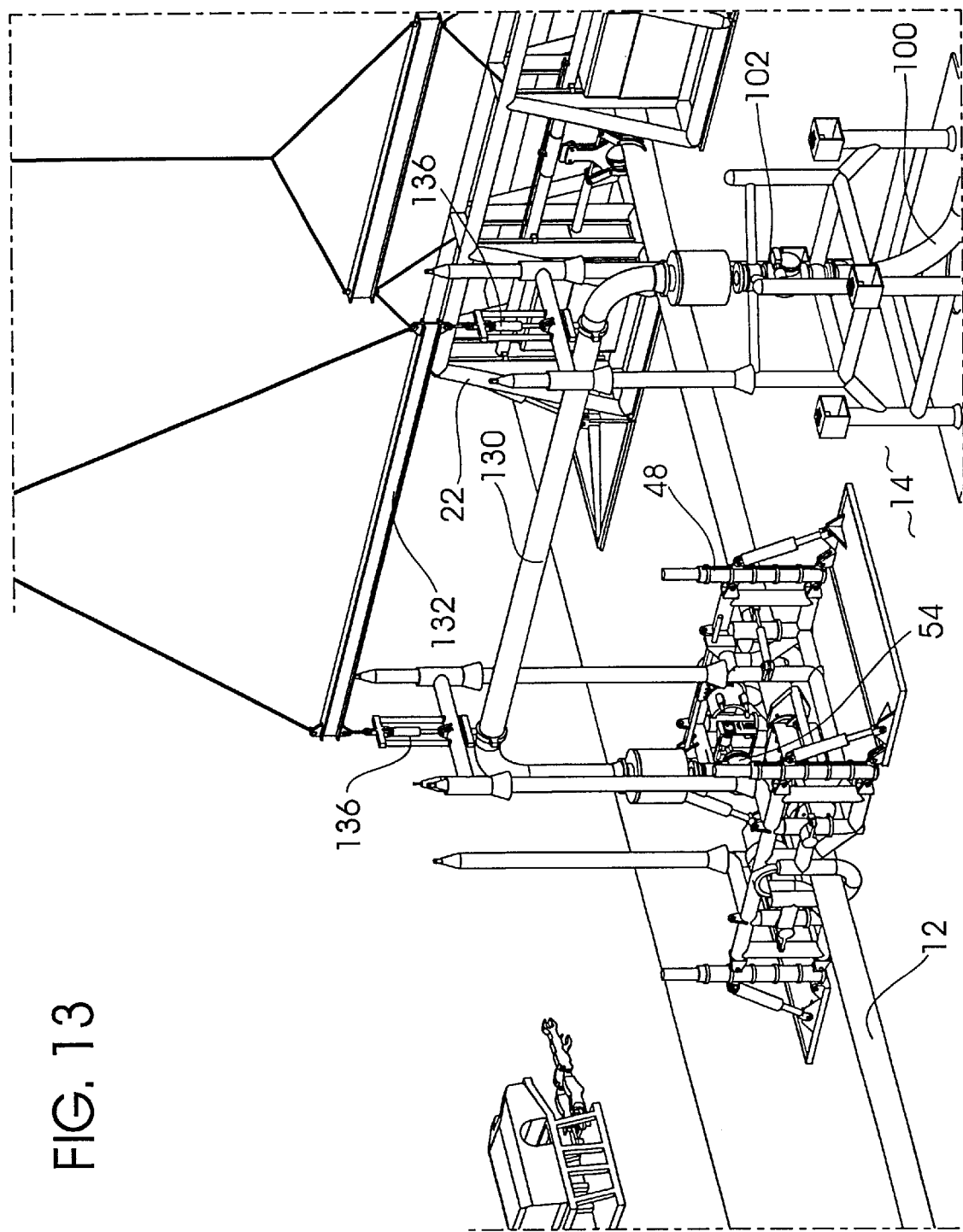
FIG. 13 illustrates lowering of the jumper in alignment with the production hub and the pipeline fitting clamp valve for use of the guide posts on the orientation frame and on the production frame.
Figure 14:
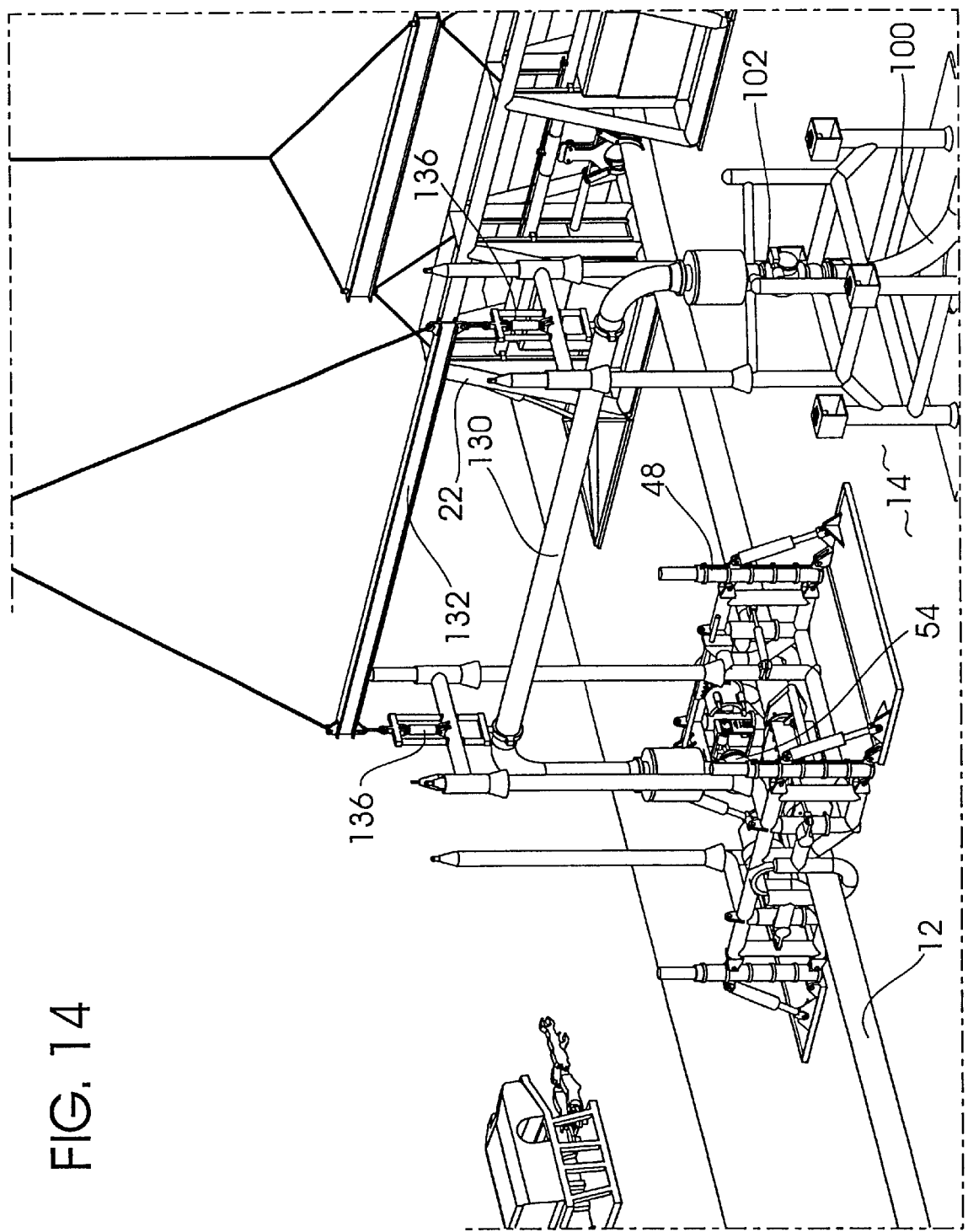
FIG. 14 illustrates the final lowering through use of valves on a jumper frame to brings the jumper into sealing alignment.

Finally, as seen in FIG. 13, hydraulic cylinders 136 gradually lower the jumper 130 until the sealing faces meet. Collet connectors then seal off the jumper valve/hub interfaces. FIG. 14 shows the jumper 130 after it has been connected.

Figure 15:
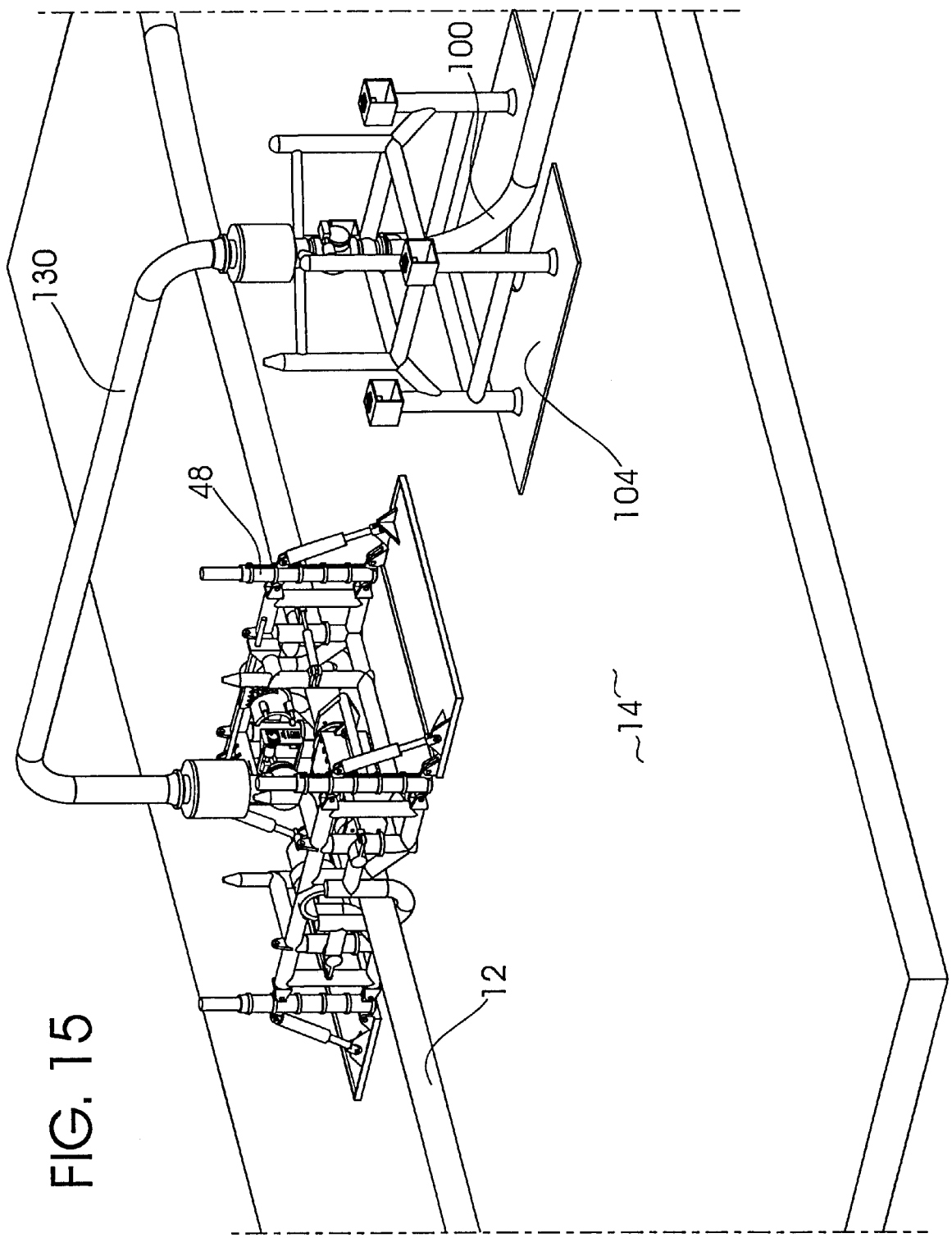
FIG. 15 illustrates the final connection of the jumper following which removal of the guide posts and pipe lift frames will be accomplished.

In a final step, as seen in FIG. 15 the guide posts 60, 62, 64, and 66, and the pipe lift frames 20 and 22 are retrieved to the surface.

Whereas, the present invention has been described in relation to the drawings attached hereto, it should be understood that other and further modifications, apart from those shown or suggested herein, may be made within the spirit and scope of this invention.

What is claimed is:

1. A diverless process of tapping a pressurized subsea pipeline without removing said pipeline from service, which process comprises:
    (a) lowering and landing a measurement tool onto said pipeline and checking ovality and checking straightness of said pipeline with said measurement tool;
    (b) lowering and landing at least a pair of pipe lift frames onto said pipeline;
    (c) lifting said pipeline on said pipe lift frames;
    (d) lowering and landing a hot tap fitting clamp assembly contained in an orientation frame on said pipeline between said pipe lift frames;
    (e) incrementally raising said pipe lift frames until said pipeline is fully seated in the hot tap fitting and orientation frame;
    (f) lowering a hot tap machine onto said hot tap fitting and orientation frame;
    (g) tapping said pipeline with said hot tap machine; and
    (h) lowering said pipeline.

2. A diverless process of tapping a pressurized subsea pipeline as set forth in claim 1 wherein the step of lifting said pipeline is accomplished by hydraulic actuators or mechanical screws on said lift frames.

3. A diverless process of tapping a pressurized subsea pipeline as set forth in claim 1 including the additional steps prior to said lowering and landing of said hot tap fitting contained in said orientation frame of:
    (a) lowering and landing a weld bead removal tool onto said pipeline; and
    (b) grinding any longitudinal weld beads from said pipeline.

4. A diverless process of tapping a pressurized subsea pipeline as set forth in claim 3 wherein power and control for said measurement tool, said hot tap fitting, said orientation frame, said hot tap machine and a torque tool or stud tensioner are all powered by a remote operating vehicle.

5. A diverless process of tapping a pressurized subsea pipeline as set forth in claim 3 wherein said step of lowering of said measurement tool includes the steps of:
    clamping said measurement tool onto said pipeline; and
    welding, grinding or milling a longitudinal or circumferential weld bead.

6. A diverless process of tapping a pressurized subsea pipeline as set forth in claim 1 including the preliminary steps of:
    excavating from underneath said pipeline by using a remote operated vehicle to allow unrestricted installation of said measurement tool;
    cleaning off said pipeline using brushes or low pressure water jets; and
    removing protective or external coatings from said pipeline.

7. A diverless process of tapping a pressurized subsea pipeline as set forth in claim 6 including the step following said excavating of dispersing soil entrained water by hydraulically powered fans or chemical flocculation to maintain visibility.

8. A diverless process of tapping a pressurized subsea pipeline as set forth in claim 1 wherein said step of lowering and landing at least a pair of pipe lift frames onto said pipeline includes the additional steps of:
    lowering and landing each said pipe lift frame at a prescribed spacing from a chosen hot tap location;
    positioning a plurality of mud mats on said lift frames from a travel position to a down and locked position; and
    locking tongs on each lift frame mechanically to said pipe.

9. A diverless process of tapping a pressurized subsea pipeline as set forth in claim 1 including the additional step of again lowering and landing said measurement tool onto said pipeline after installation of at least a pair of pipe lift frames and checking ovality and checking straightness.

10. A diverless process of tapping a pressurized subsea pipeline as set forth in claim 1 including the additional step of lowering a plurality of guide posts on said pipe lift frames substantially vertical to said pipeline prior to said lowering of said hot tap machine.

11. A diverless process of tapping a pressurized subsea pipeline as set forth in claim 1 wherein a valve and connector hub assembly are lowered with said orientation frame.

12. A diverless process of tapping a subsea pipeline as set forth in claim 1 including the additional preliminary steps of performing a preliminary visual condition inspection including use of a camera to report bottom conditions, visibility, type of soil, water current, location of circumferential and longitudinal weld seams and surface pipeline defects.

13. A diverless process of tapping a pressurized subsea pipeline as set forth in claim 1 including the additional steps of rotating the hot tap fitting clamp about the pipeline to orient the fitting clamp to the pipeline and measuring the orientation of said valve.

14. A diverless process of tapping a pressurized subsea pipeline as set forth in claim 1 wherein the step of lowering said pipeline is accomplished by hydraulic actuators or mechanical screw on said lift frames.

15. A diverless process of tapping a pressurized subsea pipeline as set forth in claim 1 including the additional steps of:

installing a receptacle in a hub on the hot tap fitting and on a production valve hub;

measuring distance between said hub receptacles and production valve hub receptacle;

lowering jumping spool between hub and production receptacle; and sealing off jumper-valve hub interfaces.

* * * * *